Patented Apr. 5, 1932

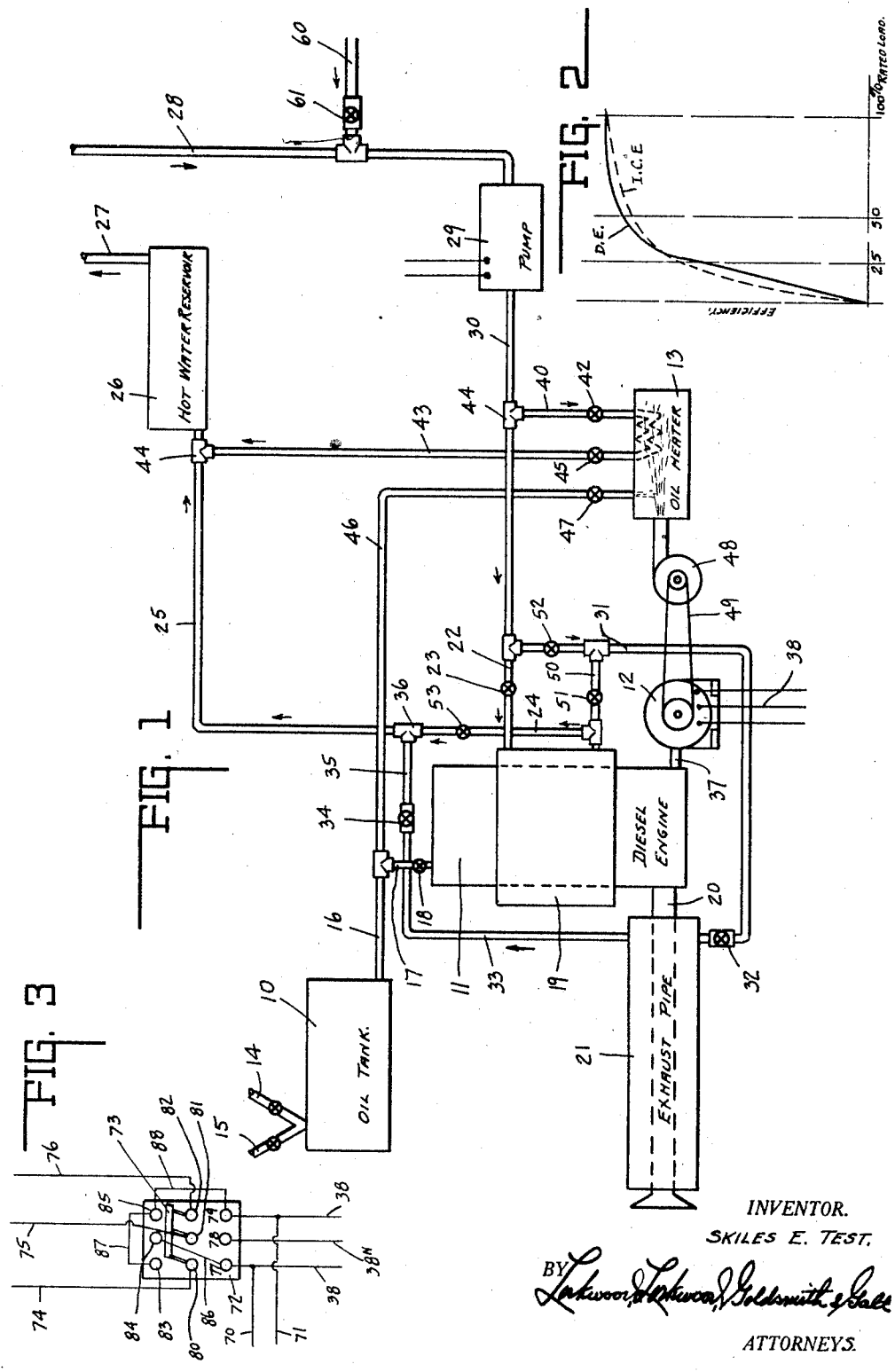

1,852,273

UNITED STATES PATENT OFFICE

SKILES E. TEST, OF INDIANAPOLIS, INDIANA

HEAT, LIGHT, AND POWER SYSTEM

Application filed October 29, 1928. Serial No. 315,904.

This invention relates to a combination power, lighting and heating system.

The chief object of the invention is to arrange a system which can economically compete with central station supply for light, power and heat.

The chief feature of the invention consists in a unitary combination heat, light and power plant or system including an electric generator and a prime mover, preferably in the form of a Diesel engine. In practice this system has demonstrated an efficiency of approximately 33⅓% more per pound of fuel than heretofore obtainable in standard practice.

Another feature of the invention consists in the arrangement of the lighting load connection such that most efficient operation of the Diesel can be obtained at all times under substantially all loads.

The full nature of the invention will be understood from the accompanying drawings and the following description and claim:

In the drawings Fig. 1 is a diagrammatic view of the system. Fig. 2 is a comparison load and efficiency curve chart for Diesel and internal combustion engines. Fig. 3 is a detail and plan of a switch arrangement.

In the drawings 10 indicates a suitable supply tank containing fuel for a suitable prime mover 11 connected to a suitable generator of electric energy 12. 13 indicates a hot water heater for hot water for consumption and or heating purposes, particularly the latter. All of the foregoing are old in the art, and the present invention consists in the connections therebetween for economically utilizing the same.

The fuel supply preferably is oil, which may be crude oil supplied by line 14 or may be a filtered crank case oil supplied by line 15. The latter is available and relatively inexpensive and preferably is utilized in installations where the system is employed in garages as has been the case with one embodiment of this invention. Line 16 connects to tank 10, by branch 17 controlled by valve 18, the prime mover which is preferably a Diesel engine since it is very efficient, requires but little attention and can be obtained commercially in suitable sizes.

The Diesel engine 11 is water jacketed as at 19, and the exhaust 20 is also water jacketed as at 21. A supply line 22 controlled by valve 23 supplies cool water to the water jacket 19 and the discharge 24 therefrom connects by line 25 to a hot water supply reservoir tank 26 which supplies, by suitable lines, risers or headers 27, radiators and faucets and the like for heat and consumption purposes respectively. The surplus or return is returned by line 28 to the system and line 28 includes a pump 29 which by line 30 is connected to supply line 22 of the water jacket. Pump 29 may be directly connected to Diesel engine 11 or electrically to an electrical generator driven thereby.

A branch 31 of the pump pressure supply line controlled by valve 32 supplies cool water to the water jacket 21 about the exhaust 20 of the engine and the discharge 33 therefrom controlled by valve 34 is connected by line 35 to the discharge 24 and hot water reservoir supply line 25 by the T-fitting 36.

The Diesel engine is mechanically and preferably directly connected as at 37 to the generator 12 and drives the same to supply electric energy suitably for power and light purposes to the lines 38.

An auxiliary hot water heater system includes an intake 40 connected by a T-fitting 41 to the pump pressure supply line 30 and the valve 42 controls the supply of cool water to the water heater 13, the hot water leaving by line 43 connected to line 25 by T-fitting 44, said discharge being controlled by valve 45. The heat for heating the water passing therethrough is obtained by the use of fuel such as oil supplied by line 46, the same being an extension of the tank supply line 16 and said line 46 being controlled by valve 47. Preferably a blower 48 suitably driven by the electric generator 12 as by a belt or mechanical connection 49 is also employed. An individual motor for the blower may be employed which however would be connected to the lines 38.

In hot weather no hot water is required for heating and during the summer months the load upon the generator and therefore upon the engine is relatively light, so that the water jacketing circulation for the engine only is approximately sufficient to supply hot water for consumption purposes. In cooler weather the lighting load increases, the load upon the Diesel engine increases, the heat generated thereby increases and the exhaust pipe hot water heater 21 is then cut in to the system and helps supply heat to the hot water reservoir. If desired, instead of having the two hot water jackets connected in parallel, they may be connected in series as by the pipe 50 including valve 51 and valve 52 in line 31 and valve 53 in line 24. Closing valves 52 and 53 and opening valve 51 causes the hot water from one water jacket to pass in series to the other water jacket, opening said valves puts the two jackets in parallel, and closing valves 52 and 34 eliminate the exhaust pipe water jacket heater. Selective connection and control is thereby possible.

During cold weather when the heating system is operating under a heavy load, the heat generated by the two water jackets is not sufficient for heating and consumption purposes and then the water heater 13 is placed in operation and serves to help carry the load. Supply line 60 controlled by valve 61 supplies cold water to the system to replenish any loss occasioned by leakage or consumption.

The present arrangement permits the employment of a unit power plant with an economy better than that obtainable from a central station. The waste heat in the Diesel engine jacket, and the waste heat in the exhaust gases, and the waste crank case oil all can be utilized as aforesaid, and the result is a flexible system which recovers in the form of useful energy ⅓ of the total energy and which is now wasted in the form of dissipated heat.

It will of course be understood that the water supplied to the jackets can be treated whenever the same is of sufficient hardness to warrant the same so as to prevent scaling. All other usual operating or construction practices employed in the hot water heating art may also be employed wherever necessary.

In Fig. 2 there is illustrated a comparison chart showing the efficiency operating characteristics of a Diesel engine and an internal combustion engine, the full line showing the Diesel curve and the broken line showing the internal combustion engine curve. From this chart it is apparent that the internal combustion engine has better operating efficiency up to one-quarter loads, that is, at lower percentages of full load greater operating efficiency is obtainable than from the Diesel engine under light load and having a similar rated capacity. In the vicinity of one-half load the Diesel engine is the most efficient of the two. If the Diesel engine can be operated at half speed by rated load a considerable gain in operating efficiency is obtainable.

In Fig. 3 there is illustrated a switch and circuit diagram of connections for shifting the arrangement of the load relative to the generator and therefore the Diesel engine. In said figure 72 indicates a switch of three pole, double throw type with the blades 73 and the nine binding posts 77 to 85 inclusive. Posts 77 and 84 are connected by jumper 86 while posts 83, 85 and 79 are connected by jumpers 87 and 88. The generator 12 is a three wire generator which at full load speed delivers 220 volts to the outside lines 38 and the neutral line 38n is also provided and the same is connected to the balance coil of the generator and to the switch at post 78. The outside feed wires 38 are connected to the posts 77 and 79 of the switch 72.

The lighting load is shown connected in three wire circuit arrangement and is arranged to be connected to the supply line as two shunted circuits, or as a series of circuits but divided. When the Diesel engine and generator travel at half speed the voltage delivered to the outside lines 38 is approximately 110. When it travels at normal rated speed the voltage delivered is 220 volts. In the first instance the two lighting circuits having three wires are connected in parallel to the outside supply lines 38. In the latter instance the three load wires are connected in split voltage relation thereby impressing substantially the same voltage on the two circuits. The two outside lines of the lighting circuit are indicated by the numerals 74 and 76 and the middle line is indicated by the numeral 75, and lines 74, 75 and 76 are connected respectively to the central binding posts 80, 81 and 82 of the switch 72.

Since the two outside lines 38 are connected to the posts 77 and 79, the neutral or balancing line is connected to posts 78. When the switch 73 is thrown down the neutral wire 38 is employed. When the switch is thrown up the use of the neutral wire is discontinued. In either instance 110 volts is impressed across the two portions of the lighting circuits even though the voltage in the supply circuits changes from 110 to 220 volts.

Lines 70 and 71 are connected to the outside lines 38 and said lines constitute a power circuit and the voltage in this circuit will vary according to the voltage generated, but in a power circuit this is relatively unimportant while in a lighting circuit it is essential that the voltage remain within a ten percent range.

The result of the aforesaid arrangement is that the Diesel engine is able to operate at half speed and half load and still supply through the direct connected generator 110 volts to the lighting circuit or supply 110 volts at full speed and full load to the lighting circuit.

The invention claimed is:

In a unitary heat and power system, the combination with a power generating unit including a fuel combustion engine having an exhaust conduit, of a hot water heating system including separate water jackets for said engine and the said exhaust conduit, inlet and outlet pipes for said water jackets, a pipe connection between the two inlet pipes, a pipe connection between the two outlet pipes, a pipe connection between the inlet pipe of one of said jackets and the outlet pipe of the other of said jackets and valves in each of said pipe connections by the manipulation of which the water to be heated may be passed through the two jackets in parallel or in series.

In witness whereof, I have hereunto affixed my signature.

SKILES E. TEST.